United States Patent [19]

Karlberg et al.

[11] 4,345,614
[45] Aug. 24, 1982

[54] HYDRAULIC STEERING AND OPERATING DEVICE

[75] Inventors: Niels G. Karlberg; Poul H. H. Pedersen, both of Nordborg, Denmark

[73] Assignee: Danfoss A/S, Nordborg, Denmark

[21] Appl. No.: 178,880

[22] Filed: Aug. 18, 1980

[30] Foreign Application Priority Data

Aug. 24, 1979 [DE] Fed. Rep. of Germany ....... 2934221

[51] Int. Cl.³ ............................................ F16K 49/00
[52] U.S. Cl. .................................... 137/340; 137/101; 60/384; 60/422; 60/456; 91/517
[58] Field of Search ....................... 137/101, 340, 118; 91/516–518, 532; 60/422, 384, 456

[56] References Cited

U.S. PATENT DOCUMENTS

| | | | |
|---|---|---|---|
| 3,602,243 | 8/1971 | Holt et al. | 137/115 |
| 4,043,419 | 8/1977 | Larson et al. | 60/384 X |
| 4,122,677 | 10/1978 | Budzich | 91/518 X |
| 4,129,986 | 12/1978 | Heinrich | 60/456 X |

*Primary Examiner*—A. Michael Chambers
*Attorney, Agent, or Firm*—Wayne B. Easton

[57] ABSTRACT

The invention relates to hydraulic steering apparatus of the type having valve gear for selectively directing pressurized fluid to and from opposite sides of a servomotor connected to vehicle wheels to be steered. This type of steering apparatus only requires pressurized fluid when actuated and may provide an auxiliary circuit with pressured fluid at times when it is not being actuated. Priority valves give priority to the steering apparatus. During extended intervals when pressured fluid is supplied to an auxiliary circuit, parts of the steering apparatus are subjected to substantial cooling. Then when the priority valve diverts hot pressurized fluid from the auxiliary circuit to the cooled steering apparatus the temperature differential causes an adverse effect on the steering apparatus by creating a tendency for binding of parts due to the unequal expansion of valve sleeves. A heat exchanger is provided having passages through which hot pressurized fluid to and from the priority valve is passed and the housing of the heat exchanger is in contact with the housing of the steering apparatus in the vicinity of the inlet and outlet ports of the steering apparatus. The heat exchanger prevents the steering apparatus parts from extensive cooling and the harmful uneven expansion of valve sleeve is avoided.

3 Claims, 6 Drawing Figures

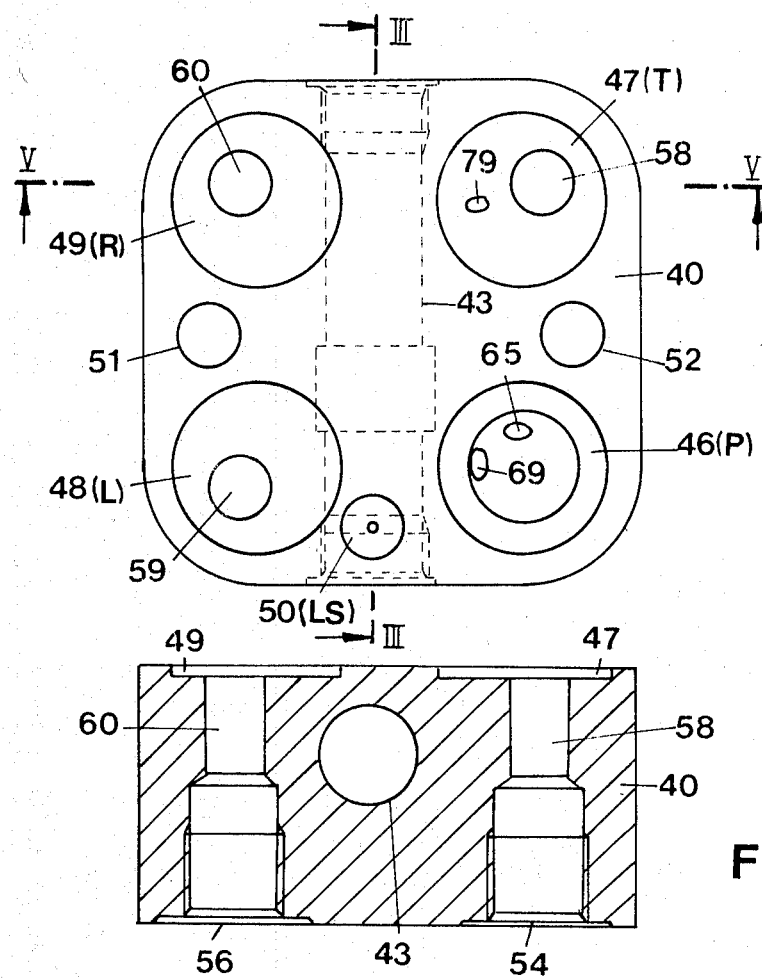
Fig.4
Fig.5
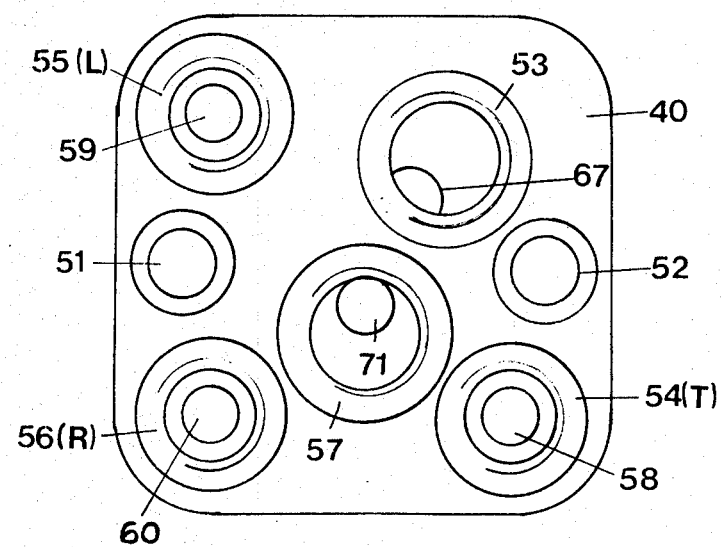
Fig.6

HYDRAULIC STEERING AND OPERATING DEVICE

The invention relates to a hydraulic steering and operating device in which the pressure fluid feeds on the one hand a steering circuit comprising a steering servo-motor controlled by the steering valve of a steering unit and on the other hand an operating circuit comprising an operating servo-motor controlled by an operating valve, wherein a priority valve is provided which, depending on the requirement for pressure fluid by the steering circuit, throttles the pressure fluid supply to the operating circuit, the operating valve establishes communication between the connection on the pressure side and the tank in the neutral position, and the housing of the steering unit is heated by pressure fluid also in the neutral position of the steering valve.

In hydraulic devices wherein an operating circuit is provided in addition to the steering circuit, a steering unit is usually employed in which the steering valve completely blocks (closed centre) the connection on the pressure side in the neutral position so that the entire pressure fluid is available for the additional load in the operating circuit when it is not required for steering. This leads to cooling of the housing of the steering unit. When warm or even hot pressure fluid flows through the steering unit during the next steering operation, the movable internal components, especially slide sleeves, warm up more rapidly than the housing and this leads to jamming with the small amount of play that is required.

This problem was countered by a known device of the aformentioned kind (DE-OS No. 27 37 788) in that in the neutral position a bypass passage is produced through the steering valve from the connection on the pressure side to the tank, said passage having a throttle so that about 5% of the maximum amount of pressure fluid flows through. However, this sacrifices the advantage of the closed centre operation; the additional load in the operating circuit only has an amount of pressure fluid available that is reduced by about 5%.

The invention is based on the problem of providing a hydraulic steering and operating device of the aforementioned kind in which outside the steering operation the entire amount of pressure fluid is available for the operating circuit but jamming of the steering valve is nevertheless prevented.

This problem is solved in that the steering valve completely blocks the connection on the pressure side in the neutral position and that the housing of the steering unit is associated with a heat exchanger connected in front of the priority valve on the primary side.

In this construction, the housing of the steering unit will, when the steering valve assumes its neutral position, become warm in that the entire amount of pressure fluid which is available and which flows back either to the operating servo-motor or to the tank by way of the priority valve and the operating valve dissipates heat to the housing of the steering unit in the heat exchanger. No quantities of pressure fluid need therefore be branched off for heating purposes. A larger amount of pressure fluid is available for the operating circuit. The losses are lower. Since a very large amount of pressure fluid is available for heating purposes, the effectiveness of heating is comparatively high; the housing of the steering unit is therefore kept at a temperature which is not so very different from the temperature of the pressure fluid.

It is particularly favourable if the heat exchanger is formed by a block lying against the outside of the housing of the steering unit. In this way, the steering unit can be constructed in the same way as hitherto. It is also possible to equip them with steering units subsequently. A simple face-to-face contact between the block and the housing is adequate for the transmission of heat.

In another embodiment of the invention, the priority valve can be accommodated in the heat exchanger block. This not only saves conduits from the heat exchanger to the priority valve but also a separate housing for the priority valve.

Further, it is favourable if an overpressure valve is provided in the block. This overpressure valve permits one to construct the block with the smallest wall thickness for the given limiting pressure without damage being caused by pressure peaks such as those which can occur when external forces act on the steering motor. Consequently, the mass of the block can be kept small; it can comparatively rapidly follow the temperature of the pressure fluid and correspondingly more rapidly transmit heat to the housing of the steering unit.

If the priority valve and overpressure valve are disposed in the heat exchanger block, the priority valve should comprise a valve slide which carries the valve seat of the overpressure valve and surrounds the closing member thereof. This results in a comparatively short axial length and a good adaptation to the dimensions of the steering unit.

The invention will now be described in more detail with reference to preferred examples illustrated in the drawing, wherein:

FIG. 4 is an underplan of the FIG. 3 block;

FIG. 5 is a cross-section on the line V—V in FIG. 4, and

FIG. 6 is a plan view of the FIG. 3 block.

Figure 1:
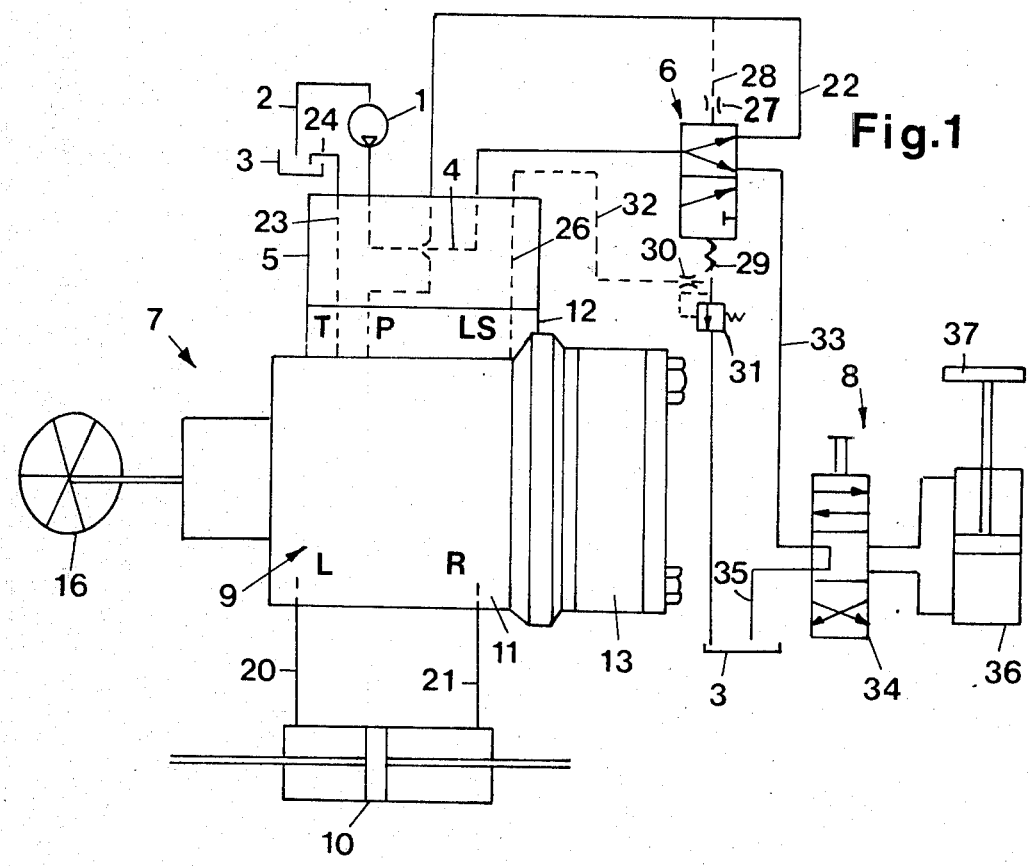
FIG. 1 shows a hydraulic steering and operating device according to the invention partly as a circuit and partly diagrammatically.
Figure 2:
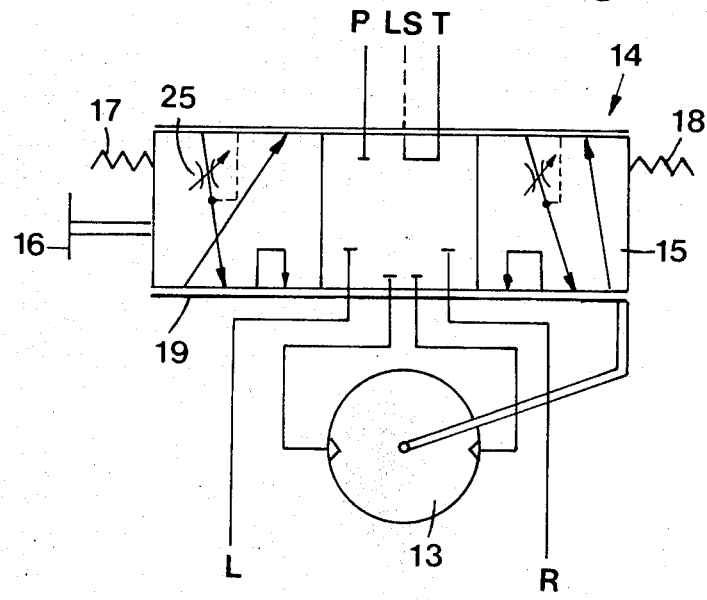
FIG. 2 is a circuit of the steering unit employed.
Figure 3:
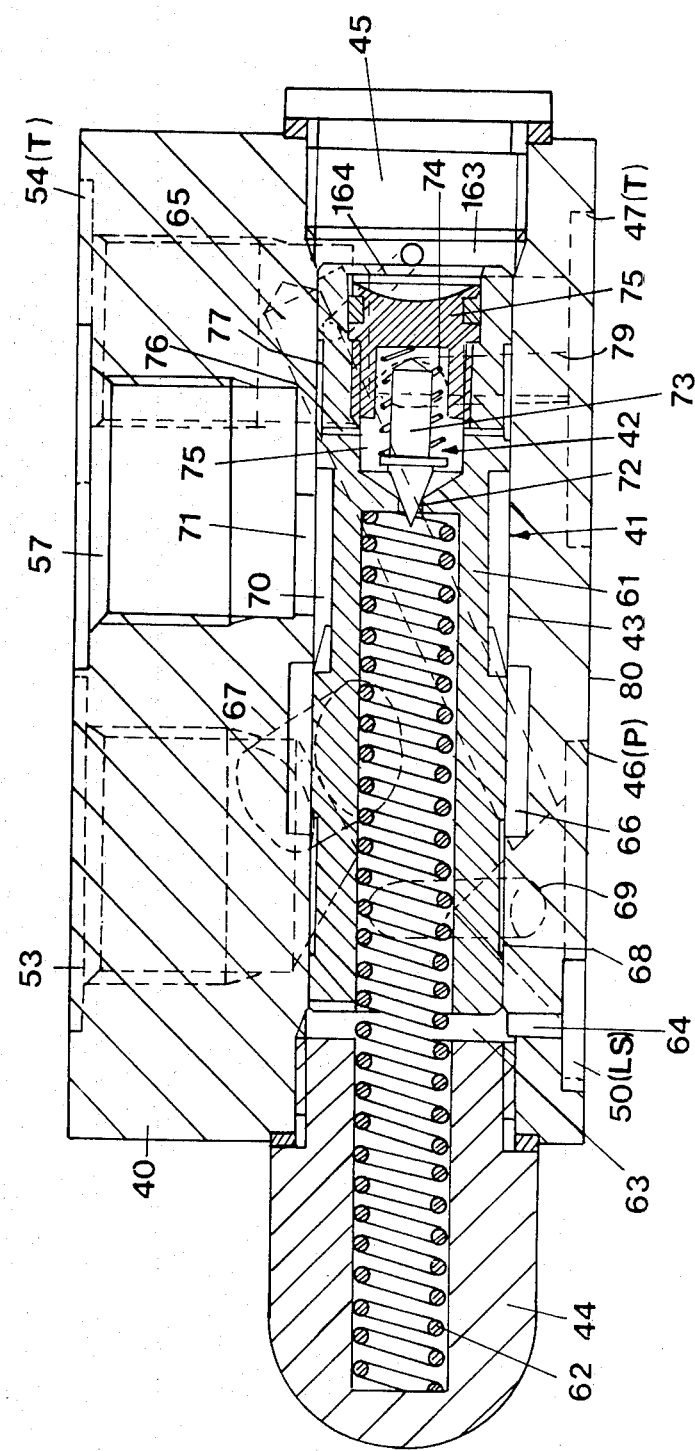
FIG. 3 is an enlarged longitudinal section through a second embodiment of a heat exchanger block taken on the line III—III in FIG. 4.

According to FIGS. 1 and 2, a pump 1 which can deliver a constant volume or be adjustable sucks pressure fluid through a conduit 2 from a tank 3 and delivers it through a conduit 4 in a heat exchanger block 5 to a priority valve 6 from which it can flow either into a steering circuit 7 or into an operating circuit 8.

The steering circuit 7 comprises a steering unit 9 and a steering servo-motor 10 which, for example, moves the wheels to be steered. The steering unit comprises a housing 11 with a projection 12 having connections and a metering motor 13. Within the housing there is a steering valve 14 (FIG. 2) which, in known manner, comprises an inner sleeve 15 adjustable by means of a steering element 16 against the force of neutral position springs 17 and 18 and a follow-up sleeve 19 connected to the metering motor 13. The connection L communicates with the one operating chamber through a conduit 20 and the connection R communicates with the other operating chamber of the steering servo-motor 10 by way of a conduit 21. The connection P is connected to the priority valve 6 by way of a conduit 22 which also passes through the heat exchanger block 5. The connection T is connected by way of a passage 23 in the heat exchanger block 5 to an outlet conduit 24 leading to the tank 3. Behind a throttling point 25, the pressure is scanned and led out through a connection LS (load sensing) and a passage 26 in the heat exchanger block 5. Upon movement of the steering element 16, the steering valve 14 will open depending on the direction. The steering servo-motor 10 receives an amount of pressure fluid proportional to the turning angle of the steering element, the amount being measured by the metering motor 13.

The priority valve 6 is loaded in the one direction by the pressure in the conduit 22 by means of a control conduit 28 containing a throttle 27 and in the other direction by a spring 29 and the LS pressure of the steering valve by way of a control conduit 32 which comprises a throttle 30 and is connected to the tank 3 by way of an overpressure valve 31. Accordingly, it has the illustrated position when there is no steering but it throttles the flow in the operating circuit 8 as more pressure fluid is required in the steering circuit 7.

In the operating circuit 8, the pressure fluid flows through a conduit 33 to an operating valve 34 which, in the illustrated neutral position, permits the pressure fluid to flow back to the tank 3 through a conduit 35 and in one of the two operating positions leads it to an operating servo-motor 36 which, for example, actuates a lifting platform 37.

Accordingly, the entire amount of pressure fluid flows through the heat exchanger block 5 and dissipates heat to the block 5 in the passage 4 even when the steering valve is in its neutral position and the connection P on the pressure side is completely closed. This heat is transmitted to the housing 11 of the steering unit at the abutment face between the block 5 and the projection 12. This housing therefore always has a temperature adapted to the temperature of the pressure fluid. There is no danger of any jamming as a result of different thermal expansion when there is another steering operation.

The embodiment of FIGS. 3 to 6 provides a heat exchanger block 40 which contains the priority valve 41 and an overpressure valve 42. A throughhole 43 is closed at one end by a cap 44 and at the other end by a screw 45. At the underside there are five connections 47 to 50 which communicate directly with corresponding connections of the steering unit, namely the connection 46 with the connection P, the connection 47 with the connection T, the connection 48 with the connection L, the connection 49 with the connection R and the connection 50 with the connection LS. Further, two holes 51 and 52 will be evident for corresponding fastening screws. At the top there are screw-threaded connections 53 to 57 of which the connection 53 is at pump pressure, the connection 54 is connected to the tank 3, the connection 55 can be connected to the conduit 20 and the connection 56 can be connected to the conduit 21. The operating conduit 33 can be connected to the connection 57. The connections 47 and 54, 48 and 55 as well as 49 and 56 are interconnected by respective throughholes 58, 59 and 60.

The priority valve 41 comprises a slide 61 which is biassed by a spring 62. The left-hand end of the slide in FIG. 3 bounds a chamber 63 which is connected to the connection 50 by way of a hole 64 so that it is at the load pressure LS. The other end face bounds a chamber 163 which is connected to the connection 46 by way of two holes 164 and 65. Consequently the slide 61 assumes a position which depends on the pressure drop at the throttle 25. An annular groove 66 in the block 40 communicates with the connection 53 by way of a hole 67.

It defines a first throttle point together with an annular groove 68 in the slide 61 that is connected to the connection 46 by way of a hole 69 and a second throttle point together with an annular groove 70 in the slide 61 that is connected to the connection 57 by way of a hole 71.

If there is no steering, the slide 61 moves to its left-hand limiting position. The entire amount of pressure fluid is passed by way of the second throttle point from the annular groove 66 into the annular groove 70 and then further to the operating valve 34. During steering operation, the slide 61 moves to the right and reduces the second throttle point whilst at the same time the first throttle point is opened more and more so that an appropriate amount of pressure fluid can flow to the steering unit.

The overpressure valve 42 comprises a seat 72 in the slide 61 and a closing member 73 which is completely surrounded by the slide 61 and is pushed by a spring 74 against its seat. The spring is supported by a screw stud 75. This forms a valve chamber 75 which is connected by way of radial passages 76 to an annular groove 77 in the slide which, in turn, is connected to the tank connection 47 by way of a hole 79. Accordingly, if excess pressure occurs within the block 40, the overpressure valve will open to expel this pressure directly to the tank.

In this embodiment, the entire amount of pressure fluid likewise flows through the heat exchanger block 40 of which the surface 80 makes metallic contact with the corresponding face of the steering unit. When the steering valve and the first throttle point in the priority valve are closed, this amount of pressure fluid flows through the hole 67, the annular groove 66, the annular groove 70 and the hole 71 to the operating circuit connection 57.

What is claimed:

1. A hydraulic steering system comprising, pump and tank means, steering apparatus having a housing with supply and exhaust ports on one side thereof and a pair of servomotor operating ports, said steering apparatus having valve means with throttle supply passages for selectively directing fluid from said supply port thereof to either of said servomotor operating ports and from the other of said servomotor operating ports to said exhaust port, a heat exchange block attached to said one side of said steering apparatus housing and having a pair of supply conduit means and exhaust conduit means extending between one of said conduit means and connecting said pump and tank means respectively to said housing supply and exhaust ports, priority valve means in said conduit means having steering and auxiliary mode positions, branch conduit means extending from said priority valve means and forming auxiliary circuit means, connecting said priority valve means to upstream and downstream sides of said throttle supply passages to effect selection of said steering mode position or said auxiliary mode position, the fluid flow for said steering mode position being from said pump means through the other of said supply conduit means through said priority valve means through said one of said supply conduit means to said steering apparatus supply port, the fluid flow for said auxiliary mode being from said pump means through the other of said supply conduit means, and through said priority valve means to said auxiliary circuit means, said pairs of supply conduit means crossing in said heat exchange block to allow pressurized fluid passing through said other of said supply conduits through said priority valve means in said auxiliary mode to act in a heat exchange relationship with said one of said supply conduit means and said steering apparatus valve means.

2. A hydraulic steering system according to claim 1 wherein said priority valve means and portions of said pair of said supply conduit means connected thereto are provided externally of said heat exchange block.

3. A hydraulic steering system according to claim 1 wherein said priority valve means and portions of said pair of said supply conduit means connected thereto are disposed internally of said heat exchanger block.

* * * * *